United States Patent
Leung et al.

[11] Patent Number: 5,473,485
[45] Date of Patent: Dec. 5, 1995

[54] TRIPAD AIR BEARING MAGNETIC HEAD SLIDER

[75] Inventors: Chak M. Leung, Palo Alto; Carroll S. Gooden, San Jose; Edgar M. Williams, Palo Alto, all of Calif.

[73] Assignee: Read-Rite Corporation, Milpitas, Calif.

[21] Appl. No.: 383,978

[22] Filed: Feb. 6, 1995

Related U.S. Application Data

[63] Continuation-in-part of Ser. No. 180,832, Jan. 13, 1994, abandoned, which is a continuation of Ser. No. 978,991, Jan. 19, 1993, abandoned, which is a continuation-in-part of Ser. No. 928,614, Aug. 10, 1992, abandoned, which is a continuation of Ser. No. 846,719, Mar. 6, 1992, abandoned.

[51] Int. Cl.$^6$ ................................................ G11B 5/60
[52] U.S. Cl. ............................................................ 360/103
[58] Field of Search ................................ 360/102–106; 29/603

[56] References Cited

U.S. PATENT DOCUMENTS

| | | | |
|---|---|---|---|
| 4,555,739 | 11/1985 | Le Van et al. | 360/103 |
| 4,700,248 | 10/1987 | Coughlin et al. | 360/103 |
| 4,802,042 | 1/1989 | Strom | 360/103 |
| 4,870,521 | 9/1989 | Okabayashi | 360/103 |
| 4,894,740 | 1/1990 | Chhabra et al. | 360/103 |
| 4,922,356 | 5/1990 | Yamaguchi et al. | 360/104 |
| 4,998,033 | 3/1991 | Hisabe et al. | 360/98.07 |
| 5,021,906 | 6/1991 | Chang et al. | 360/103 |
| 5,128,822 | 7/1992 | Chapin et al. | 360/103 |
| 5,175,658 | 12/1992 | Chang et al. | 360/103 |
| 5,287,235 | 2/1994 | Cunningham et al. | 360/103 |

FOREIGN PATENT DOCUMENTS

| | | | |
|---|---|---|---|
| 61-980 | 1/1986 | Japan | 360/103 |
| 1-2988585 | 12/1989 | Japan | 360/103 |
| 4-17176 | 1/1992 | Japan | 360/103 |

*Primary Examiner*—Robert S. Tupper
*Assistant Examiner*—Jefferson Evans
*Attorney, Agent, or Firm*—Nathan N. Kallman

[57] ABSTRACT

A tripad air bearing slider useful in a disk drive is designed with two outer pads that extend from two or more tapered sections at the leading edge of the slider towards the trailing edge. The pads are configured and angled so that a desired lift force is obtained that acts in opposition to a force provided by a spring loaded flexure or load beam. The angles that define the shape of the three pads are formed by simple mechanical cutting, using a diamond cutting wheel, for example, or alternatively by ion milling or reactive ion etching.

27 Claims, 6 Drawing Sheets

5,473,485

TRIPAD AIR BEARING MAGNETIC HEAD SLIDER

This application is a Continuation-In-Part of Ser. No. 08/180,832 filed Jan. 13, 1994, now abandoned; which is a Continuation of Ser. No. 07/978,991 filed Nov. 19, 1993, now abandoned; which is a Continuation-In-Part of Ser. No. 07/928,614 filed Aug. 10, 1992, now abandoned; which is a Continuation-In-Part of Ser. No. 07/846,719 filed Mar. 6, 1992, now abandoned.

FIELD OF THE INVENTION

This invention relates to a magnetic head slider and in particular to a method and means of making a head slider useful in a hard disk drive.

DESCRIPTION OF THE PRIOR ART

Magnetic head air bearing sliders typically are formed with outer longitudinal rails that extend from the leading edge to the trailing edge of the slider. The leading or upstream edge is defined as the edge of the slider which the rotating data track of a disk passes prior to traversing the length of the slider towards the trailing or downstream edge. During operation of a disk drive, the air bearing surfaces of the sliders experience a fluid flow that provides a lift force to fly the sliders relative to the rotating disks.

Major objectives in the design of air bearing head sliders are to fly the sliders and their transducers as close as possible to the surface of the disk and to maintain a constant close spacing and substantial uniform flying height. The close spacing, when used with very narrow transducing gaps such as provided with thin film heads and also with very thin magnetic films on the disk surface, allows short wavelength signals to be recorded, thereby affording high density recording with improved storage capacity. By having constant spacing between the head and the disk, the amplitude of the signal being recorded or read out is not varied significantly, thus improving signal resolution and making data processing more reliable.

Presently, head slider assemblies are produced by depositing a multiplicity of thin film transducers on a ceramic wafer, then cutting the wafer into row bars, and processing the bars to form air bearing sliders having longitudinal rails with tapers at the leading edge. In the case of TPC (transverse pressure contour) sliders, the rails and adjacent regions are made by etching, such as reactive ion etching, ion milling, electrostatic discharge machining or ultrasonic machining. These processes are time consuming and costly. The etched depth of the recess regions are critical to attaining uniform flying height.

SUMMARY OF THE INVENTION

An object of this invention is to provide a magnetic head slider having a substantially reduced size and significantly lower mass and weight than prior known sliders.

Another object of this invention is to provide an air bearing head slider that realizes a substantially uniform flying height.

Another object is to provide an air bearing slider that has a low takeoff velocity and achieves a relatively light landing on a disk surface.

Another object is to provide an air bearing slider that has a relatively low coefficient of static friction.

Another object is to provide a slider design means that allows producing a multiplicity of pad/taper configurations to optimize the flying characteristics of the slider.

Another object is to provide an improved process for producing an air bearing slider with a significant savings in time and cost.

A further object is to provide an air bearing slider that has long durability for start-stop contact operation.

According to this invention, an air bearing slider is fabricated with three pads and adjacent recesses. Two outer pads are located at the sides of the slider, and tapers are provided between the leading edge and the two outer pads. A third central pad extends from the trailing edge substantially along the central longitudinal axis of the slider. The pole tips that define the transducing gap of the thin film transducer are deposited at the trailing edge of the slider and are coincident with the air bearing surface at the third pad. Proper edge blending on the pads eliminate sharp edges and corners.

In one implementation of this invention, the recesses are cut out by mechanical sawing, preferably by ganged diamond saw wheels. During production, a plurality of row bars of slider elements are positioned and fixed in a staggered arrangement. The sawing apparatus cuts across the row bars at predetermined angles. The rise angle of the tapers extending from the leading edge to the outer pads are formed by lapping with a lapping plate. In this way, each slider being fabricated is configured with the same air bearing surface design. Alternatively, the pads are defined by masking and subsequent ion milling, reactive ion etching, electrostatic discharge machining or ultrasonic machining.

In a preferred embodiment, two angular saw cuts from the trailing end to the leading end of the slider and one horizontal or lateral saw cut serve to define the geometry of the three pads, the tapers and the recessed regions for all the row bars being processed simultaneously. Various modifications of the angular portions of the three pads can be made to change lift force, or to desensitize for skew which is experienced in disk drives using rotary head actuators.

In particular embodiments of the invention, the two outer pads of the slider have angled inner sides or angled portions of the inner sides which are configured so that the widest portion of the two outer pads is adjacent to the taper sections. In such embodiments, the third rear pad has two angled sides, each side being parallel respectively to the angled sides or angled side portions of the two outer pads. In preferred embodiments of the invention, the two outer pads at opposing sides of the slider are formed with the widest portion adjacent to the taper section and the narrowest portion towards the trailing end of the slider. The third rear pad has two angled sides, defining a trapezoid or a triangle. In one implementation, the pads and tapered sections are substantially rectangular and the front pads extend only part way from the leading edge to the trailing edge of the slider.

BRIEF DESCRIPTION OF THE DRAWINGS

The invention will be described in greater detail with reference to the drawings in which:

FIGS. 4–12 are cross-sectional plan views showing alternative designs of air bearing sliders, made in accordance with this invention, wherein FIG. 7 represents a microslider;

DETAILED DESCRIPTION OF THE INVENTION

For the purpose of explanation, a full size standard slider is defined as having dimensions of about 0.160 inch long, 0.125 inch wide and 0.0345 inch high. A microslider is defined as having dimensions about 70% of those of a standard slider, for example, about 0.112 inch long, 0.088 inch wide and 0.024 inch high. A nanoslider has dimensions about 50% of the standard slider dimensions, for example, about 0.080 inch long, 0.063 inch wide and 0.017 inch high. The standard size slider is about 0.160 inch long, 0.125 inch wide and 0.0345 inch thick. A picoslider has dimensions of about 30% of the standard slider with dimensions of about 0.049 long, 0.039 inch wide and 0.012 inch high. A femtoslider has a size of about 25% of the full size standard slider with dimensions of about 0.040 inch long, 0.020–0.030 inch wide and about 0.011 inch high.

Figure 1:
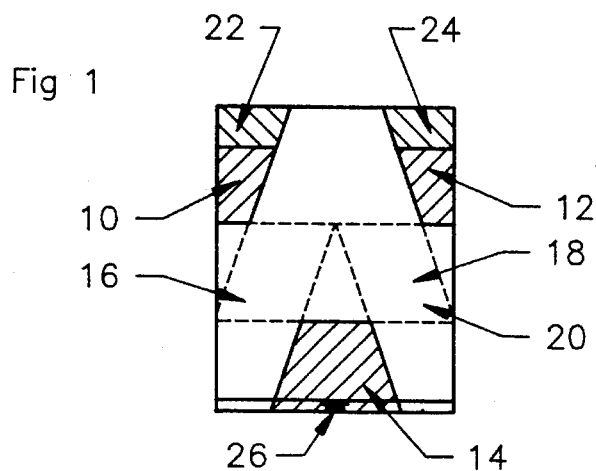
FIG. 1 is a cross-sectional plan view of a tripad microslider, made in accordance with this invention.

With reference to FIG. 1, an air bearing microslider is formed with three pads 10, 12 and 14 that provide the positive air bearing regions to the air bearing surface of the microslider.

The recess regions of the microslider are formed by cutting angular reliefs or recesses 16 and 18 and a lateral relief or recess 20 across the central portion of the slider. The three cuts made by mechanical sawing apparatus using diamond saw wheels define the geometry of the three pads 10, 12 and 14. Tapers 22 and 24 are provided at the leading or upstream edge of the slider. In a specific embodiment, the cuts for the recesses 16 and 18 are made at an angle of about 10° relative to the longitudinal axis of the slider. During production, all of the three pads of the sliders of a row bar are lapped on the same lapping plate to achieve flatness control. For a slider having a taper length of about 0.011 inch, the tapers 22 and 24 preferably have a rise angle of about 50 minutes from the leading edge to the pads 10 and 12. The relief cuts for forming the recesses are about 2–4 milli-inches deep. The pole tips 26 of the thin film transducer that is formed at the trailing or downstream edge are shown as centered, but may be located off-center to adjust for skew and to realize a constant flying height. In an actual implementation of the slider illustrated in FIG. 1, the slider successfully completed 100,000 cycles in a contact start-stop test operation, and with a coefficient of static friction significantly lower than that experienced with a typical prior art twin rail taper flat or TPC slider.

Figure 2A:
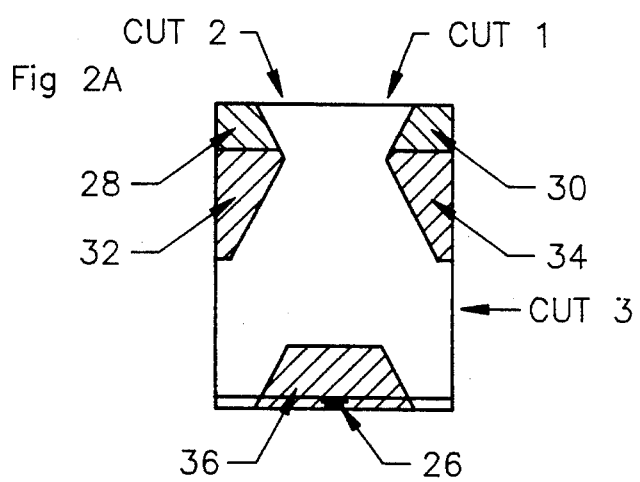
FIGS. 2A, 2B and 3 depict preferred embodiments of the novel slider of this invention, used as microsliders and nanosliders.
Figure 2B:
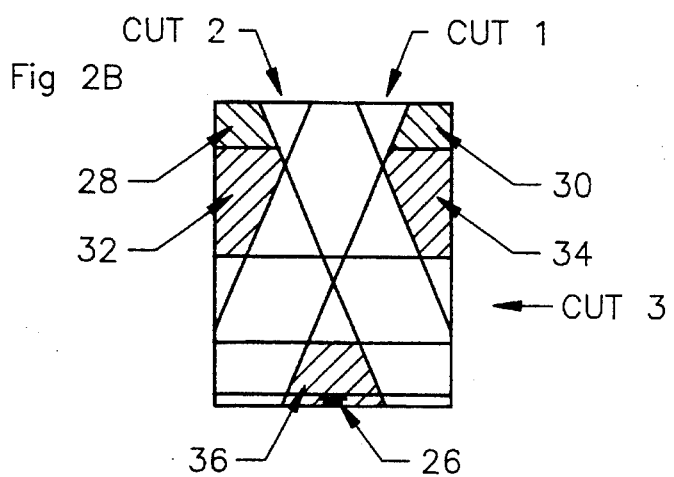

FIGS. 2A and 2B show preferred embodiments which are modified versions of the slider shown in FIG. 1. These versions are designated as having the dimensional characteristics in the range of a 70% microslider and a nanoslider. In the designs, the lateral cut 3 is not centered with respect to the horizontal central axis of the slider, but is made with one edge of the cut close to the horizontal center and the other edge of the cut closer to the trailing end of the slider. The inner exposed sides of the tapers 28 and 30 are angled in an opposing direction to the angles of the sides of the tapers 22 and 24 which are illustrated in FIG. 1. The exposed taper sides form an obtuse angle with the angled sides of the front pads 32 and 34. The outer front pads 32 and 34 extend towards the central horizontal axis of the slider and the rear pad 36 is trapezoidal and reduced in size relative to the rear pad 14 of the slider of FIG. 1.

FIGS. 2A and 2B illustrate designs of air bearing sliders in which outer pads 32 and 34 have side portions that are parallel to the major longitudinal axis of the slider and adjacent side portions that are angled to provide narrowing of the pads in the direction of the trailing end of the slider. In FIG. 2B, the trapezoidal third pad 36 at the trailing edge is narrowed to modify the lift force applied to the slider during operation with a disk drive.

Figure 3:
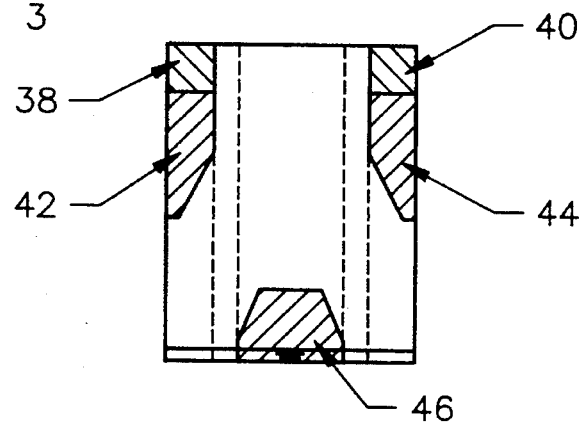

With reference to FIG. 3, to define the linear sides of the tapers 38 and 40 and the linear side portions of the pads 42 and 44, two longitudinal cuts are used in addition to the angular cuts which shape the angled sides of the trapezoidal rear pad 46 and the angled narrowing portions of the pads 42 and 44. In a specific embodiment of the slider of FIG. 3 in which the angular sides of the rear pad 46 are substantially straight, microsliders which are 70% in size of standard sliders, were fabricated to fly in a typical 3.5 inch disk drive using a rotary actuator. The flying height achieved was approximately 4.5±1 microinch from the inner to the outer diameter of the disk which was rotating at about 5400 rpm.

Figure 4:
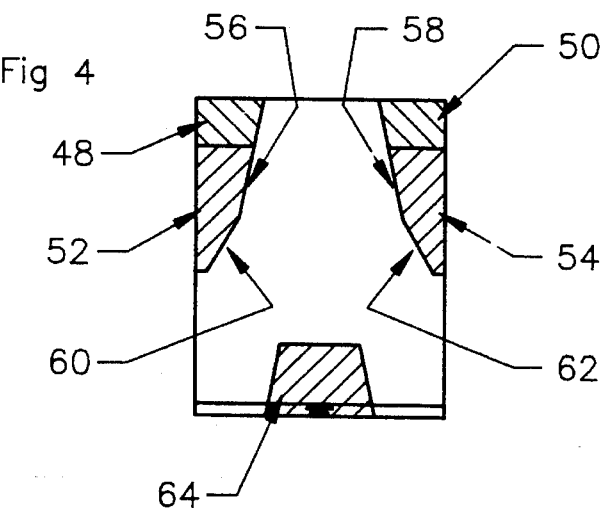

In FIG. 3, the tapers 38 and 40 are rectangular, whereas the slider of FIG. 4 has tapers 48 and 50 that are angled at the inner sides towards the center of the leading end of the slider. The angled sides of the tapers 48 and 50 extend collinearly with the angled sides of portions 56 and 58 of the front outer pads 52 and 54. The front pads 52 and 54 are formed with sharper angled sides of portions 60 and 62 adjacent to and rearward of the angled portions 56 and 58. The sharper angled portions 60 and 62 are narrower than portions 56 and 58 and extend close to the center between the leading and trailing ends of the slider. The sharper angled side portions 60 and 62 require separate cuts during fabrication in addition to the cuts required for the differently angled side portions 56 and 58. The rear pad 64 is trapezoidal in form and its angled sides are determined by the same cuts which form the angled sides of the tapers 48 and 50 and the angled portions 56 and 58.

Figure 5:
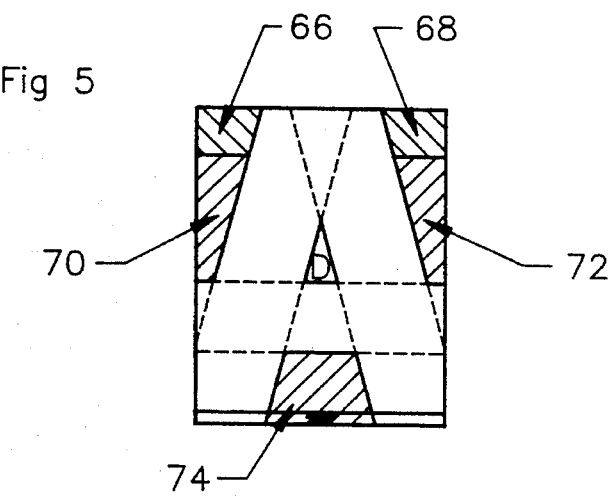

In FIG. 5, the relief cuts used to form the sharper angled portions 60 and 62 of the design of FIG. 4 are eliminated so that the angles at the sides of the tapers 66 and 68, outer front pads 70 and 72 and rear pad 74 are the same. In one implementation, the cuts are made at an angle of about 8° relative to the longitudinal axis of the slider. By using only the two angled cuts from the trailing end to the leading end, an area designated as D in the center of the slider remains to contribute additional lifting force to the slider. If desired, the section D can be processed by laser ablation, for example, to remove some or all of the material of section D so that the lift force can be modified to desired specifications.

Figure 6:
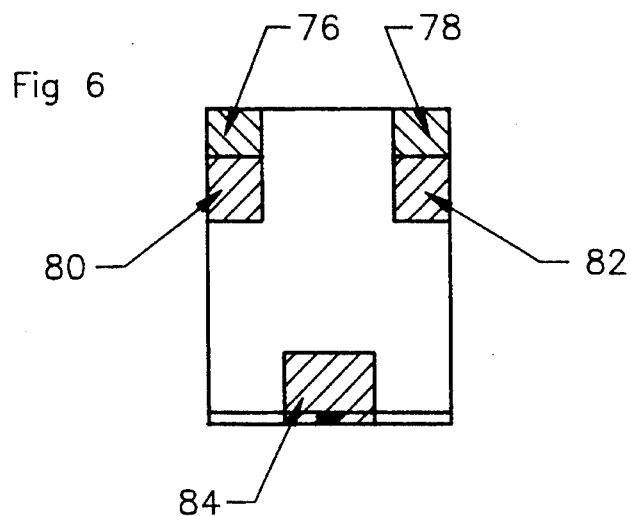

FIG. 6 displays a tripad slider having substantially rectangular tapers 76 and 78, outer front pads 80 and 82, and a rear central pad 84. In a specific implementation, the slider was made to fly at about 3 microinches relative to a disk rotating at 5400 rpm in a 3.5 inch disk drive. The tapers 76 and 78 were lapped to a rise angle of about 50 minutes and were about 0.011 inch long. The two pads 80 and 82 adjacent to the tapers 76 and 78 were made to be about 0.015 inch wide and 0.015 inch long. The relief cuts to define the recessed regions were cut to a depth of about 2–6 milli-inches.

Figure 7:
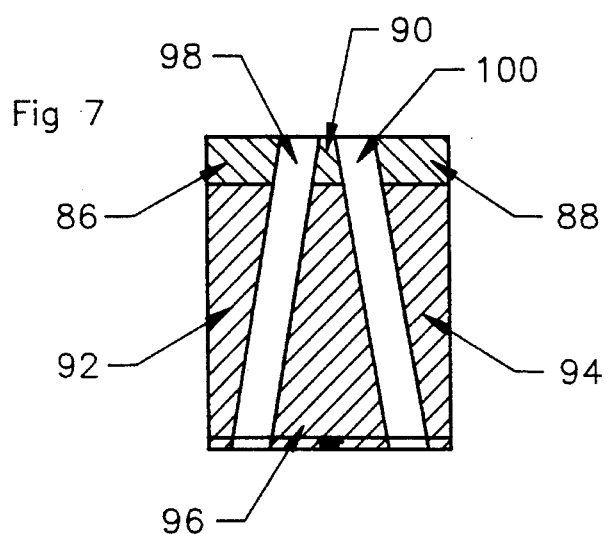

In the embodiment of FIG. 7, only two angular cuts are needed to define three tapers 86, 88 and 90 and three elongated pads 92, 94 and 96 which extend from the trailing end of the slider to the respective three tapers 86, 88 and 90. The angles of the relief slots are cut at about 10° relative to the central axis of the slider. Only two cuts are needed to define the regions between the three pads and the tapered sections. During operation of the air bearing slider of this design, the incoming air flow diverges through the recesses or slots 98 and 100 and exits equidistantly from the transducing gap at the trailing end of the slider.

Figure 8:
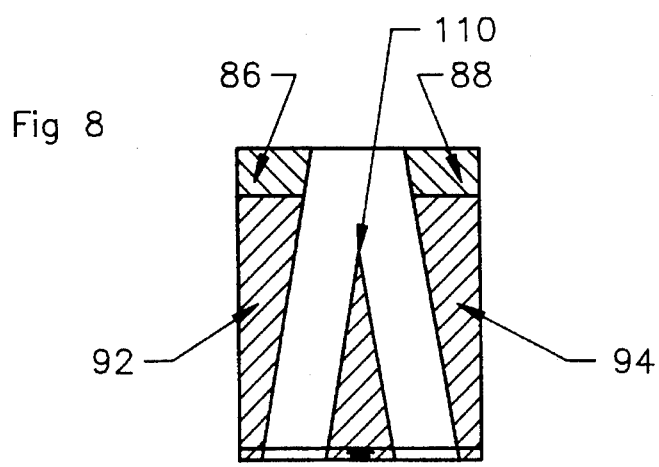

FIG. 8 shows a modified design of the slider of FIG. 7 wherein a central taper is not used. Tapers 86 and 88 and outer front pads 92 and 94 remain virtually the same. However the width of the cuts is increased so that the center taper is eliminated and the center pad 110 is narrowed and reduced in length and area to delineate a narrow triangular shape.

Figure 9:
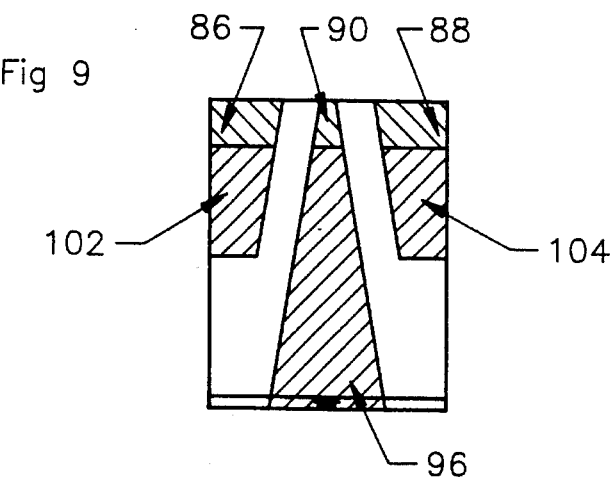

FIG. 9 shows another modified design of the slider of FIG. 7 wherein the outer pads 102 and 104 are cut by saws that move longitudinally to midway of the slider, after the angular cuts have been made to define the central pad 96 and taper 90, as well as the angled sides of pads 102 and 104 and tapers 86 and 88.

Figure 10:
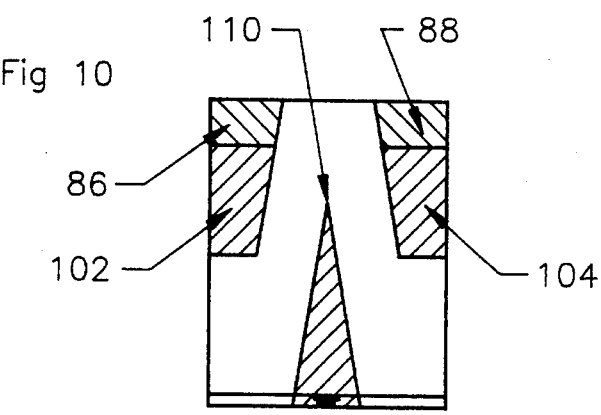

FIG. 10 incorporates the design of the outer pads 102 and 104 of FIG. 9 and the triangular center pad 110 of FIG. 8.

Figure 11:
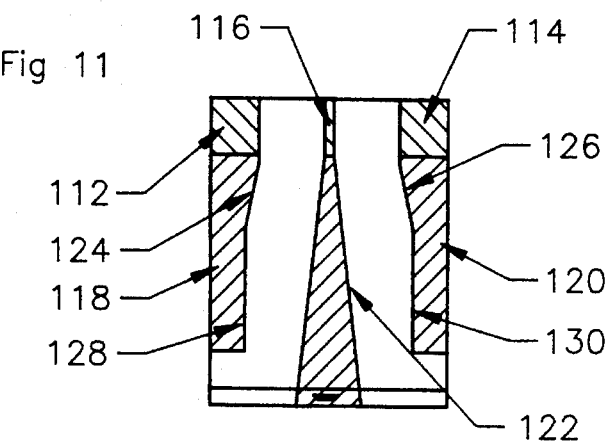

In FIG. 11, the prior art slider includes three taper sections 112, 114 and 116 which are substantially rectangular. The center taper 116 is very narrow and is adjacent to a conical central pad 122 that widens as it extends from the taper 116 to the trailing end of the slider. The outer front pads 118 and 120 have angled side portions 124 and 126 respectively adjacent to the tapers 112 and 114. Rectangular sections 128 and 130 are formed adjacent to and rearward of the pad sections 128 and 130, and extend partially along the sides of the slider beyond midway of the slider length.

Figure 12:
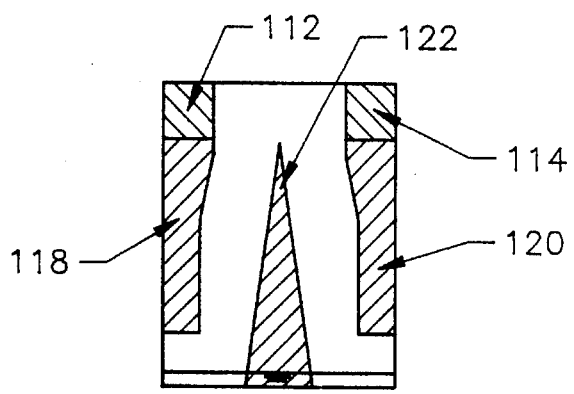

FIG. 12 shows a modified version of the design of FIG. 11 wherein there is no central taper. The slider has rectangular tapers 112 and 114 and outer front pads 118 and 120 similar to those of FIG. 12. However the central pad 122 is shaped as a triangle with its apex at a point midway between the ends of the tapers 112 and 114 which are adjacent to the pads 118 and 120.

Figure 13:
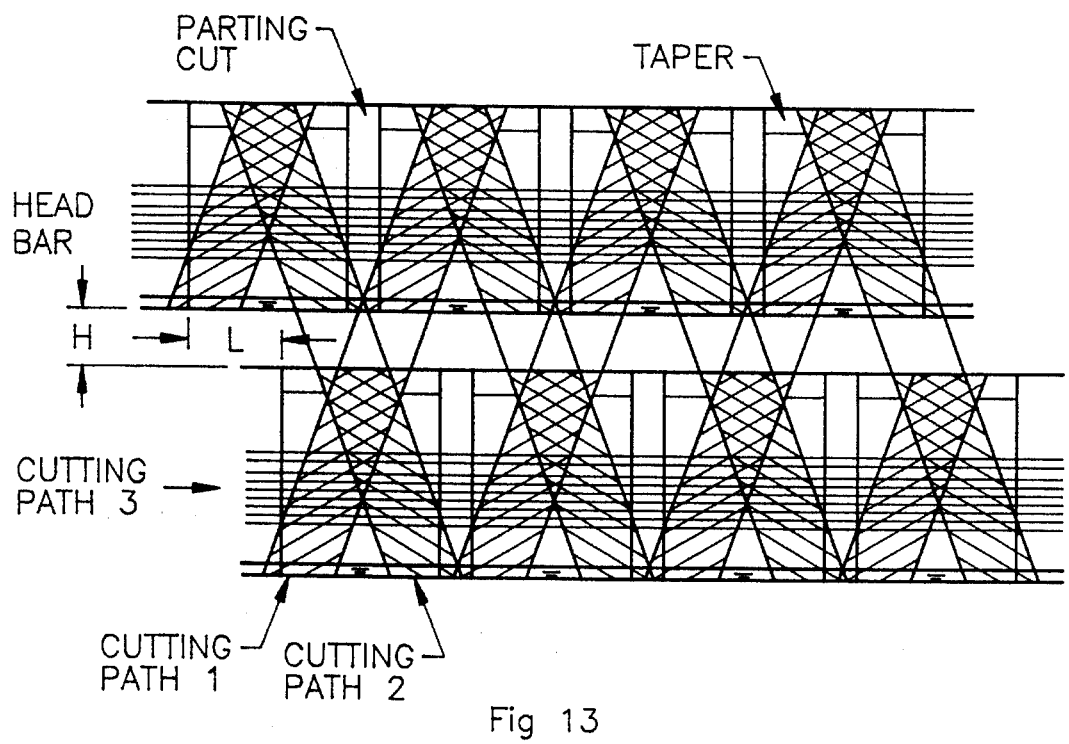
FIG. 13 is a representational view showing the shaping of the angular recesses for defining the tripad air bearing surfaces of the sliders.

FIG. 13 illustrates the novel technique used to form the reliefs and slotted recesses that define pads which provide the desired air bearing surface of the sliders. To obtain the desired angles of the slots, the row bars on which the equally spaced thin film transducers have been deposited are fixed on a holding tool in a staggered relationship. The horizontal displacement L and the vertical displacement H of the row bars are established so that when a ganged diamond saw apparatus cuts through a plurality of fixed staggered bars at a predetermined angle, the relief slots are produced in substantially the same location of each slider and at the same angle. Cutting paths 1 and 2 provide the opposing angular slotted recesses whereas cutting path 3 is used for the lateral cuts across the air bearing surface of the slider. For those designs in which the outer front pads do not extend to the trailing end of the slider, longitudinal cuts of a specified distance are made substantially orthogonal to the longitudinal axis of the slider. The tapered areas are formed separately by lapping the row bars on a lapping plate, as is well known in the art.

Figure 14:
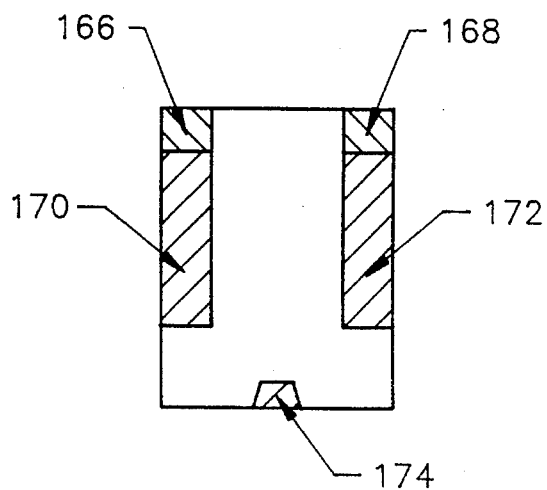
FIG. 14 is a plan view of an alternative embodiment of a tripad slider useful for contact recording.

Another embodiment of a tripad slider is depicted in FIG. 14. The tripad nanoslider is designed with leading edge rectangular tapers 166 and 168 which preferably are about 0.008 inch long having a 40 minute taper angle. Two rectangular side pads 170 and 172 follow the tapers 166 and 168 and extend to about 0.058 inch from the leading edge of the 0.080 inch long slider. The width of the rectangular tapers 166 and 168 and side pads 170 and 172 is approximately 0.009 inch. A third rear pad 174 is centrally located at the trailing end of the slider and is trapezoidal in design. The width at the trailing edge of the rear pad 174 is about 0.013 inch and the length of the rear pad is about 0.007 inch. The pads are edge blended to round out the corners and edges of the pads. The recessed area between the pads is at least 0.002 inch in depth. During assembly of the head slider to a suspension, the slider is bonded to a flexure, which allows the slider to pitch and roll. The bonding point is preferably close to the central longitudinal axis of the slider and less than the extending dimension of 0.058 inch from the leading edge of the slider. An offset from the central longitudinal axis is introduced, with a displacement towards the outer diameter (OD) of an associated disk, to minimize roll. When the slider moves from the inner diameter (ID) to the OD of the disk, the flying height tends to increase due to the faster rotary speed of the outer disk tracks. Typically in operation of a disk drive, the pitch of the slider increases causing the flying height of the transducer at the trailing edge to decrease so that the result is substantially constant flying height across the disk surface. The flying height could be low enough to be in pseudo-contact or contact with the disk. The tripad design of FIG. 14 serves to minimize wear and results in improved head/disk interface integrity for contact start-stop, contact and pseudo-contact recording.

Figure 15:
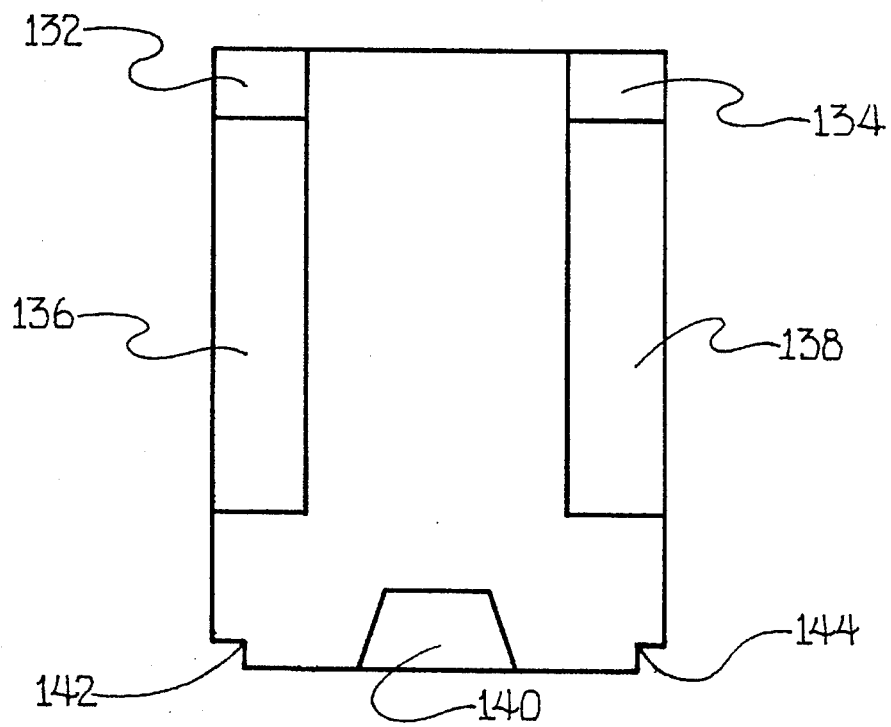
FIG. 15 is a representational plan view of an alternative configuration of the air bearing surface of the slider shown in FIG. 14.
Figure 16:
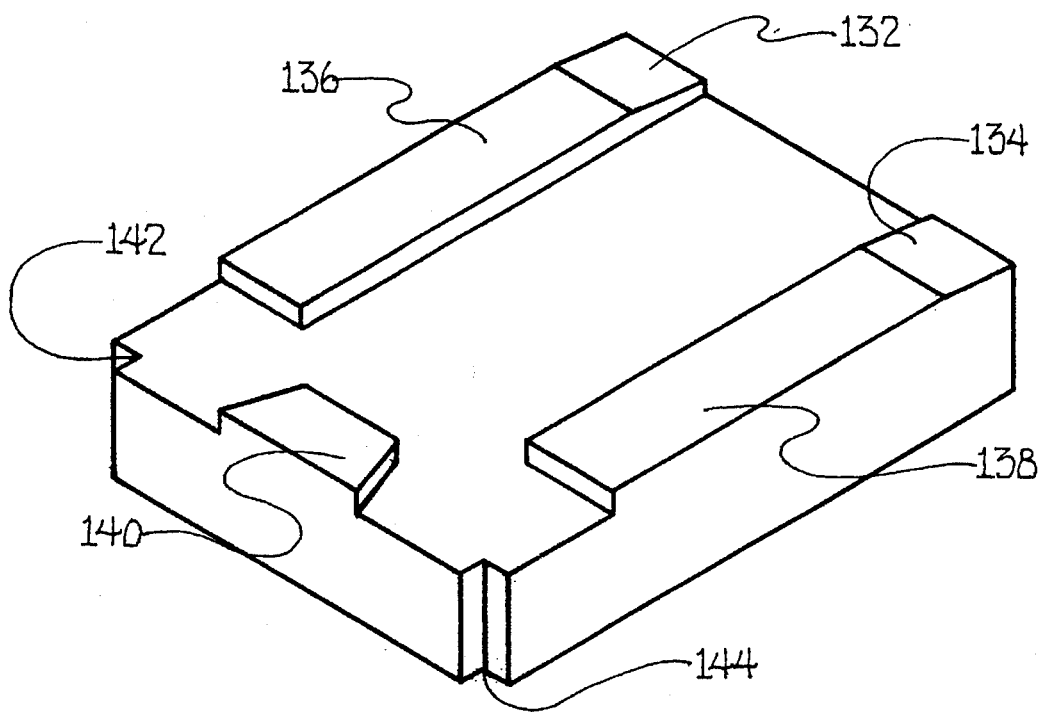
FIG. 16 is an isometric view of the slider of FIG. 15.

FIGS. 15 and 16 illustrate another embodiment of a tripad slider which is formed with tapers 132 and 134 at its leading edge, and side rails or pads 136 and 138 that extend partially towards the trailing edge of the slider. A trapezoidal-type third pad 140 is provided at the trailing edge substantially centrally relative to the longitudinal axis of the slider. In this embodiment, the slider is formed with notched portions 142 and 144 at the corners where the slider trailing edge and sides meet. The notches 142 and 144 serve to reduce the overall mass of the slider and therefore improves liftoff of the slider into flying position. Also the notches minimize the possibility of interference of the slider with the head wiring assembly, disk spacer or the disk motor hub. In one implementation of this design, the slider had an overall length of about 0.0800 inch and overall width of about 0.0630 inch, with leading edge tapers about 0.0080 inch long and 0.0100 inch wide. The length of the notches along the side was about 0.0090 inch and the width along the trailing edge was about 0.0075 inch wide. Thus the resultant width of the trailing edge was about 0.0480 inch and the resultant length along the sides was about 0.0710 inch. The trapezoidal third rear pad 140 was about 0.0070 inch long measured from the trailing edge and its largest width at the trailing edge at its trapezoidal base was about 0.0130 inch. The lengths of the side pads 136 and 138 were about 0.0500 inch measured from the tapers.

There has been described herein a tripad magnetic head air bearing slider wherein two front outer pads are located along the sides of the slider and a rear central pad is located at the trailing end of the slider. Angular cuts by ganged diamond saw wheels are made simultaneously across a plurality of row bars of sliders, which are staggered and fixed in position during the mechanical sawing operation. In this way, the pads and recesses are properly defined on the air bearing surfaces of the sliders.

In a specific implementation of the invention applied to a nanoslider, the length of the wedge-shaped central rear pad 174 from the trailing end of the slider to the leading end of the slider is in the range of 5% to 20% of the total length of the slider, such as shown in FIG. 14. A preferred length of the rear pad 174 for the configuration of FIG. 14 is about 0.007 inch. The width of the rear pad 174 of the preferred design is in the range of 0.008 inch to 0.015 inch. With the preferred design, the lift force at the rear pad ranges between 10–30% of the total lift force applied to the slider. The partial contribution of the lift force of the rear pad depends on slider size. Thus typically the smaller the slider size, the larger the lift force contributed by the rear pad. The thickness of the slider is typically reduced as the slider becomes smaller. Sliders made in accordance with this invention are disposed at a higher pitch angle relative to the rotating magnetic disk. And, the transducer at the trailing end of the slider is in contact or pseudo-contact with the surface of the rotating disk. The absolute trailing end of the slider of the instant invention is designed to operate in interference with the surface of the medium or disk on which data is recorded and from which data is read. Interference is defined as the difference between the flying height of the absolute trailing end at the rear pad of the slider and the glide height of the disk. The disk glide height is generally defined by the disk manufacturer and is the flying height at which onset of contact is detected by a flying transducer supporting a piezoelectric or acoustic detector. Typically state of the art magnetic storage disks have glide heights ranging between 1–2 microinches. The slider of the present invention is designed to be in interference with the disk by 0.1 to 1.0 microinches at its absolute trailing edge. For example, for a 2 microinch glide height disk, the absolute trailing edge of the slider would be required to fly at an absolute height from 1 to 1.9 microinches. The interference between the absolute trailing edge of the slider and the disk surface results in the absolute trailing edge of the slider being supported by the disk surface. This support by the disk surface results in suppressing undesirable spacing modulation of the transducer relative to the recording disk and accordingly decreases signal modulation. As a result, significantly improved data processing is realized by the disclosed transducer/disk interface as compared to a noncontact transducer/disk interface. The close interface between the transducer and the disk surface affords higher data bit packing and increased data density recording. Although the disclosed design is particularly applicable to nanosliders, the principle of providing a rear central pad in the range of the specified dimensions of length and width relative to the total length and width of the slider is applicable to comparable sliders of different length and width, including picosliders and femtosliders.

It should be understood that the invention is not limited to the specific designs disclosed herein. For example, the front pads may have different widths and may be asymmetrically disposed. Also the angle of the sides of the pads can vary to achieve different flying characteristics. The magnetic transducer or magnetoresistive (MR) sensor can be located off center relative to the rear pad of the slider. In addition, when ion milling, reactive ion etching, electrostatic discharge machining or ultrasonic machining is used to define the shape of the pads, the sides of the front pads do not need to be parallel to the sides of the rear pad, which occurs with mechanical saw cutting along the slider. With the disclosed tripad design, sliders having dimensions as small as 25%–50% of those of the standard slider can be made.

Prior art twin rail taper flat sliders which are used in disk drives requiring low flying height are limited to narrow rail configurations. Therefore the thin film transducer that is disposed at the trailing end of the rail is limited in width thereby limiting the number of coil turns formed for any coil layer. The tripad slider design disclosed herein makes available relatively wider space at the rear pad to overcome the limitations of the prior art two rail slider.

What is claimed is:

1. A thin film magnetic head assembly for contact or pseudo-contact recording with a magnetic disk comprising:
   a head slider having an air bearing surface and leading and trailing edges with substantially parallel first and second sides extending from said leading edge to said trailing edge, said slider having a central longitudinal axis between said edges;
   first, second and third pads formed on said air bearing surface of said slider, said first and second pads being disposed towards the leading edge of said slider at the sides of said slider and extending only partially toward the trailing edge and beyond the center of the length of the slider measured from said leading edge towards said trailing edge, said third pad being disposed at the rear center of said slider at the trailing edge, said third pad extending from said trailing edge towards said leading edge of said slider about 5% to 20% of the total length of said slider, the length of said third pad along said central axis being less than the distance from the trailing edges of said first and second pads to the trailing edge of said slider, said first and second pads being substantially rectangular and having trailing ends spaced from said trailing edge of said slider;
   said third pad being substantially wedge shaped and having leading and trailing ends substantially parallel to said trailing ends of said first and second pad;
   rectangular tapers at the sides of said slider between said leading edge and said first and second pads;
   whereby said slider maintains a relatively high pitch relative to said magnetic disk.

2. A slider as in claim 1, wherein said first and second pads are disposed equidistantly from said leading end in one direction and from said central axis in a direction perpendicular to said one direction.

3. A slider as in claim 1, including a magnetic transducer or magnetoresistive sensor disposed at the trailing edge of said slider adjacent to said third pad.

4. A slider as in claim 3, wherein said transducer or sensor is offset relative to said longitudinal central axis.

5. A slider as in claim 1, wherein said slider is about 0.160 inch long, 0.125 inch wide and 0.0345 inch high.

6. A slider as in claim 1, wherein said slider is about 0.112 inch long, 0.088 inch wide and 0.024 inch high.

7. A slider as in claim 1, wherein said slider is about 0.080 inch long, 0.063 inch wide and 0.017 inch high.

8. A thin film head assembly as in claim 1, wherein the widths of said rectangular tapers and said first and second pads are about 0.009 inch.

9. A thin film head assembly as in claim 1, wherein said tapers are about 0.008 inch long extending from the leading edge of said slider and have a taper angle of about 40 minutes.

10. A thin film head assembly as in claim 1, wherein the length of said slider is about 0.080 inch and said first and second rectangular pads extend from said taper ends to a point from the leading edge of said slider that is more than one-half of said slider length.

11. A thin film head assembly as in claim 1, wherein said first and second pads extend to a point about 0.058 inch from said leading edge.

12. A thin film head assembly as in claim 1, including a recessed area between said pads, said recessed area being at least 0.002 inch deep.

13. A thin film head assembly as in claim 1, wherein said rear center third pad is about 0.007 inch long extending to said trailing edge of said slider and is about 0.013 inch wide at the trailing edge.

14. A thin film head assembly as in claim 5, wherein the edges and corners of said pads are edge blended.

15. A thin film head assembly as in claim 1, including notched portions at the corners of said trailing edge of said slider.

16. A thin film head assembly as in claim 15, wherein said notched portions are about 0.0090 inch long and 0.0075 inch wide.

17. A magnetic head air bearing slider useful for transducing action with a rotating magnetic storage disk, said slider having substantially parallel sides and leading and trailing ends extending laterally between said sides and having a longitudinal central axis extending between said leading and trailing ends parallel to said sides comprising:

first, second and third pads, said first and second pads being disposed at opposing sides of said slider, all of said three pads having angled sides;

first and second tapered sections at the leading end of said slider, said sections being adjacent respectively to said first and second pads, said tapered sections and said first and second pads defining a central recess extending from said leading end towards said third pad;

said first and second pads extending from said tapered sections only partially towards said trailing end so as to be spaced from said trailing end, said first and second pads extending beyond the midpoint between said leading and trailing ends;

said third pad extending from said trailing end of said slider towards said leading end about 5% to 20% of the total length of said slider, said third pad being centered substantially relative to said longitudinal central axis, said third pad having a width less than the width of said slider and being spaced from said sides of said slider, and recessed areas extending laterally from the outermost edges of said third pad, whereby said slider is in contact or pseudocontact with said rotating disk during transducing operation, and said slider maintains a relatively high pitch relative to said magnetic disk.

18. A slider as in claim 17, wherein said third pad is substantially trapezoidal, the angled sides of said third pad being parallel to the angled sides of said first and second pads respectively.

19. A slider as in claim 2, wherein said recessed area includes a linear recess formed laterally and orthogonally to said longitudinal axis for defining the length of said pads between said leading and trailing ends.

20. A slider as in claim 17, wherein said tapered sections include angled sides that are collinear with the angled sides of said first and second pads.

21. A slider as in claim 17, wherein said tapered sections include angled sides that are substantially parallel to the angled sides of said third pad and form obtuse angles with the angled sides of said first and second pads.

22. A slider as in claim 17, wherein said third pad is triangular in shape.

23. A magnetic head air bearing slider as in claim 17, wherein the maximum length of said third pad along said longitudinal axis is less than the length between the furthermost trailing edges of said first and second pads and said trailing end of said slider.

24. A magnetic head air bearing slider as in claim 17, wherein said recessed areas and said central recess abut to form a continuous recess of the same depth.

25. A magnetic head air bearing slider as in claim 24, wherein said third pad is wedge-shaped and each of said outermost edges of said third pad are angled relative to said longitudinal central axis.

26. A magnetic head air bearing slider as in claim 25, wherein each of said angled sides of said first and second pads have at least one portion with an inner edge adjacent to said central recess that is angled relative to said longitudinal central axis and the edge of each of said pads at said sides of said slider opposite to said angled inner edge is parallel to said longitudinal central axis.

27. A magnetic head air bearing slider as in claim 26, wherein each of said angled inner edges of said portions of said first and second pads is collinear with an angled outermost edge of said third pad.

\* \* \* \* \*